INVENTOR
Arthur Samuel Ennis
ATTORNEYS

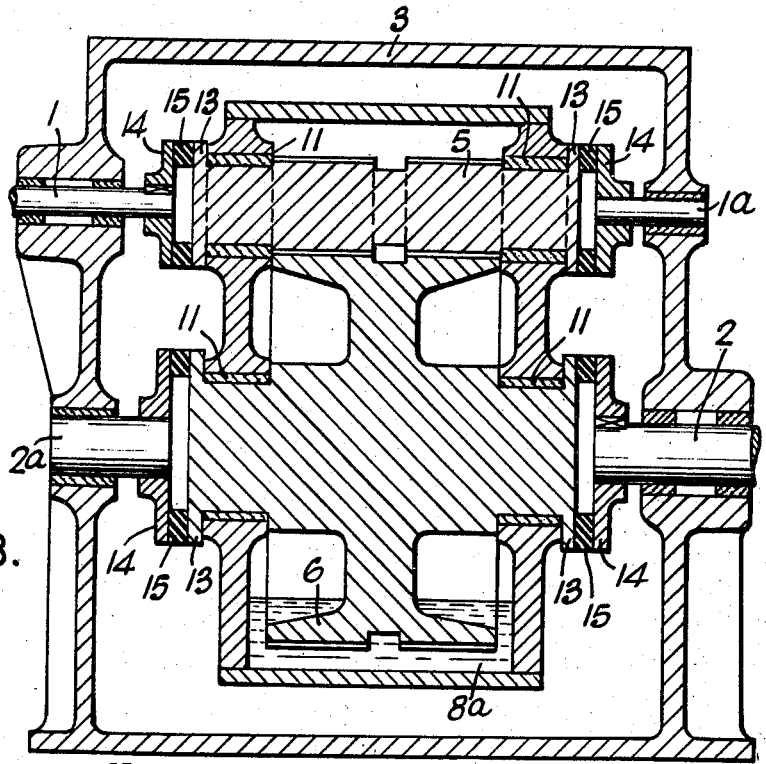
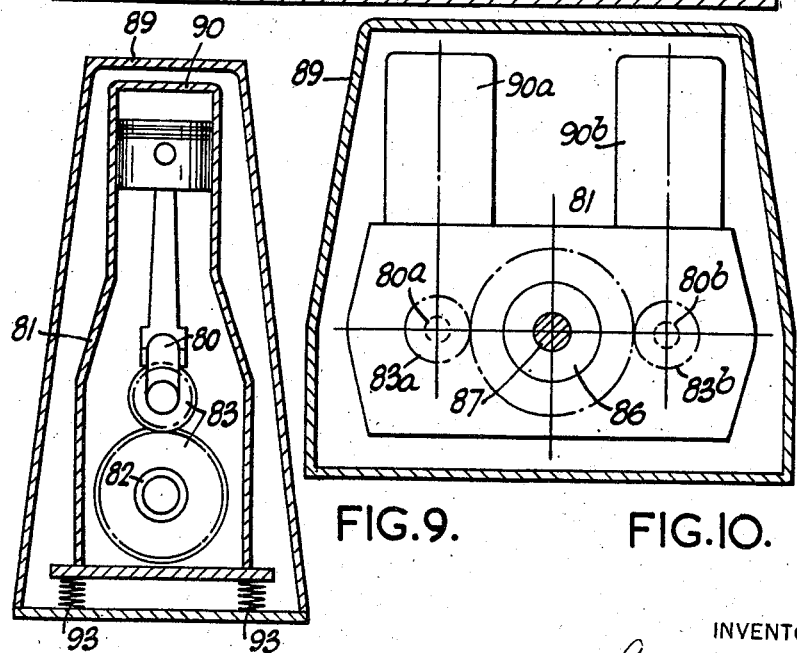
FIG. 3.
FIG. 9.   FIG. 10.

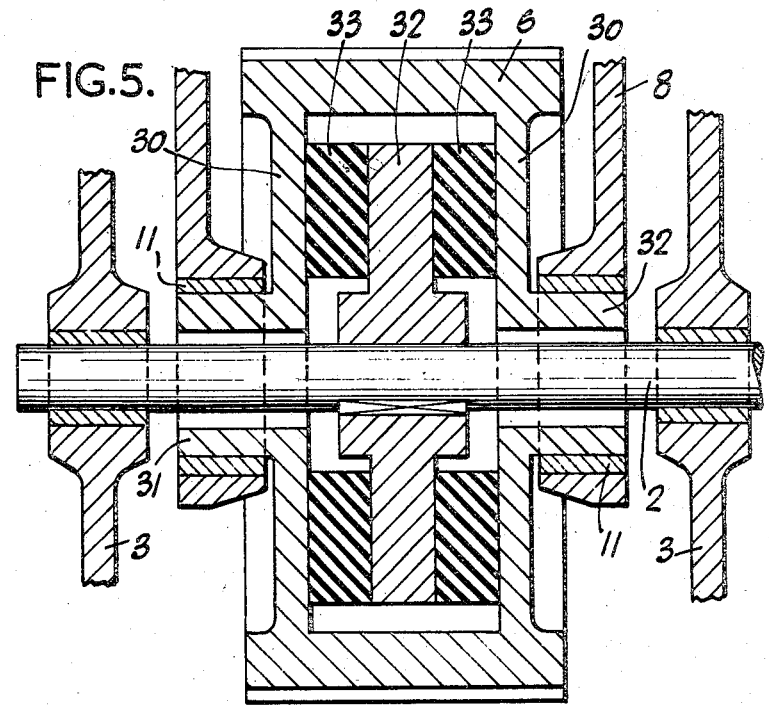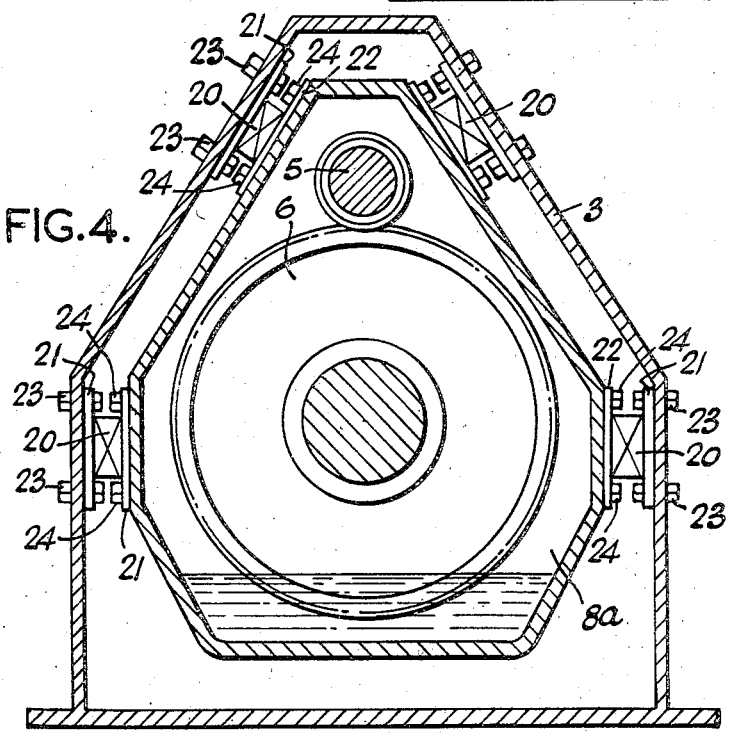

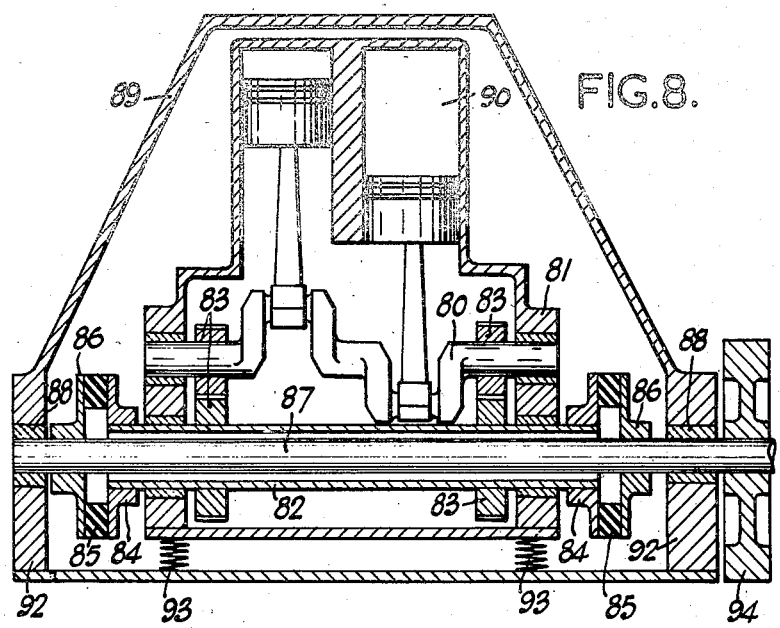
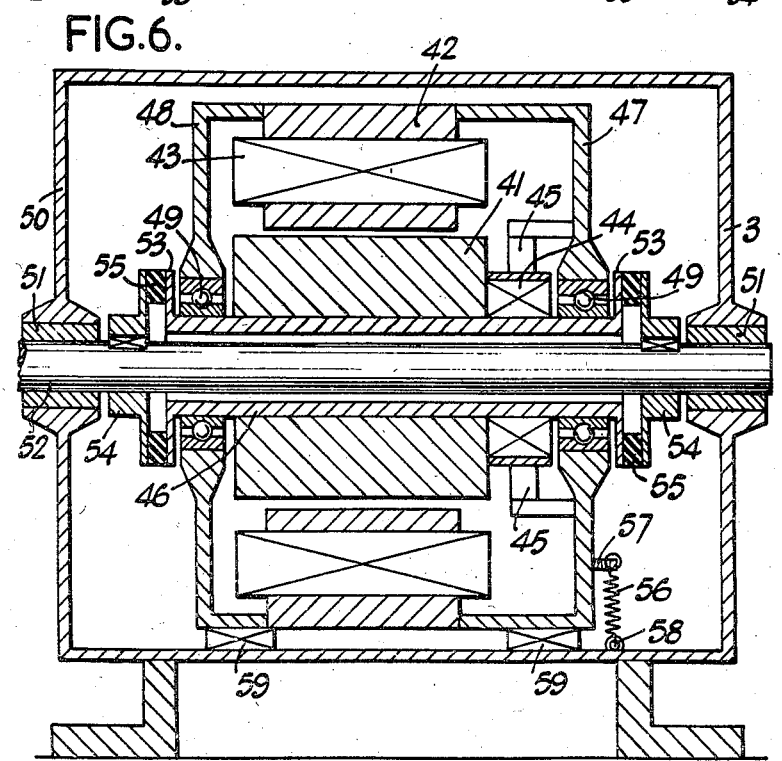

United States Patent Office 2,822,700
Patented Feb. 11, 1958

2,822,700

REDUCTION OF VIBRATION TRANSMISSION FROM MACHINES AND APPARATUS

Arthur Samuel Ennis, Sale, England, assignor to Metropolitan-Vickers Electrical Company Limited, London, England, a company of Great Britain Application August 24, 1954, Serial No. 451,895

Claims priority, application Great Britain August 26, 1953

24 Claims. (Cl. 74—411)

This invention relates to mechanical assemblies, machines, and apparatus having two or more relatively movable parts. The invention is particularly concerned with reducing the emanation of vibration generated by motion of the parts of such mechanical assemblies, machines, and apparatus. Such vibration may be transmitted to the surrounding atmosphere or the structure on which the assembly, machine, or apparatus is mounted.

This vibration is for example in many cases particularly objectionable if of audible frequency. The vibration is partly transmitted through the surrounding atmosphere, but vibration so transmitted can be attenuated by total enclosure of the machine. Transmission of vibration also takes place directly, through the supports for the machine or apparatus, to the structure upon which the machine or apparatus is mounted, and if the latter is enclosed in a casing in order to reduce airborne transmission, the casing itself will increase the effect of directly transmitted vibration.

The invention has an important application to the reduction of noise caused by vibration of gear-wheels in gear-wheel assemblies having gear-casings which at least partly surround the gear-wheels and in which shafts for the gear-wheels are journalled.

In the manufacture of gear-wheels, errors and irregularities in the tooth profile and pitch will result in vibration being set up when the gears are in motion, which vibration is usually of audible frequency and is increased in effect by its transmission to the gear-casing from which it readily radiates. The trend in gear design, moreover, is towards smaller and more heavily loaded gears which have an even greater tendency to operate noisily.

Since it is difficult, even when every precaution is taken, to manufacture gear-wheels with sufficient accuracy to prevent the generation of noise, it has been proposed to reduce the noise by introducing resilience at or near the teeth in order to accommodate the manufacturing errors.

In many machines, for example dynamo-electric machines, ventilating fans, gas turbines and other internal combustion engines, superchargers for internal combustion engines, pumps and compressors including those operated by cams or swash-plates, vibration is generated when the machines are operated. This vibration is often of audible frequency and is therefore undesirable in many uses of the machines, for example in or near auditoria. Vibration is partly transmitted through the surrounding atmosphere, but vibration so transmitted can be attenuated by total enclosure of the machine. Transmission also takes place directly, through the supports for the machine to the structure upon which the machine is mounted, and if the machine is enclosed in a casing in order to reduce airborne transmission, the casing itself will increase the effect of directly transmitted vibration.

Moreover, in certain machine tools, it is important that vibration transmitted from the drives should be kept to a low value, and in locomotives it is desirable that the vibration generated by the driving wheels in contacting the rails should not be transmitted to the driving mechanism.

According to the invention, in a mechanical assembly comprising two or more relatively movable parts disposed within a casing, said parts are journalled with respect to one another by bearings in a frame or other spacing means maintaining said parts in required spaced relationship, and resilient coupling means, preferably resilient in all directions of vibration transmission, is provided between one or more of said parts and a torque-transmitting external shaft or shafts journalled with respect to the casing.

It will be understood that the term "mechanical assembly" used herein and in the appended claims, includes gear assemblies and other transmission assemblies such as belt or chain drives, dynamo electric machines, internal combustion and other engines and turbines, and in general all arrangements comprising two or more relatively movable parts having mechanical relation to one another and employed for mechanical, electrical or any other purpose. The frame or other spacing means referred to may comprise a normal part of the assembly, machine or apparatus as such, or may be specially provided for the purpose of the present invention.

The frame or other spacing means may be supported by said resilient coupling means or by further resilient means or by both such means.

The resilient means referred to may be of any nature having the flexibility necessary to attenuate vibration transmission. Rubber, cloth fabric, and steel or other metal spring elements may for example be employed. Where rubber is employed, the one or more elements of rubber may conveniently be bonded to one or more of the metal members of the coupling.

In the application of the invention to the reduction of transmission of vibration from a machine or apparatus having two or more parts constrained for movement relatively to one another by bearing surfaces therebetween, the arrangement accordingly comprises in combination with said parts a casing at least partly surrounding said parts, one or more bearings for one or more members for transmitting drive to or from the machine or apparatus, and resilient means also enclosed at least partly by said casing and adapted to perform the functions of supporting said parts, of coupling the rotating part with said drive transmitting member or members, and, if necessary, of restricting undesired movement of the machine, that is to say, to restrict the torque reaction on one of said parts. In some cases the arrangements may include a frame or other means, as hereinbefore indicated, carrying bearings for the co-operating parts of the machine or apparatus, for example in a gear or belt or chain drive, such frame may register the gear wheels or pulleys or sprockets on the predetermined relative axes thereof. Silencing of a belt drive is for example particularly desirable in cases wherein the belt comprises several sections or links. In other cases the bearing surfaces first referred to may serve directly to register one part of the machine or apparatus with the co-operating part, for example in a dynamo electric machine the stator may be registered with respect to the rotor by means of the usual bearings between the stator and the rotor shaft.

In the application of the invention to any mechanical assembly as hereinbefore described, the resilient means may comprise a separate member or members for performing each of the functions just above referred to, or any two of said functions may be performed wholly or partly by a common member or members of the resilient means.

In the application of the invention to a gear-wheel assembly including a casing which at least partly surrounds the gear-wheels and in which shafts for the gear-wheels are journalled, in order to reduce transmission of vibration from at least one pair of meshing gear-wheels to the casing, each gear-wheel of said pair is thus connected with the journal or journals of its shaft through resilient coupling means, preferably resilient in all directions of vibration transmission. Said coupling means are adapted to transmit the torque of the drive, for example from one or both sides or from the centre of each gear-wheel, as hereinafter more fully described, and means are provided for retaining the gear-wheels in correctly spaced relationship independently of their shafts.

According to a further feature of the invention as applied to an internal combustion engine or other reciprocating machine, the latter is arranged within a casing at least partly surrounding the engine or machine, and the crank shaft of said engine or machine is coupled by gears or otherwise with a secondary shaft which is mounted in bearings in said casing and coupled with said gearing by resilient means adapted to transmit the operating torque. The engine or machine may be supported within the casing either by the resilient means just above referred to or wholly or partly by further resilient means arranged between the crank case or other part of the engine and a supporting part or parts of said casing. Preferably, in carrying out the invention, the crank shaft is coupled by the gears or other means referred to, with a hollow shaft or quill through which the secondary shaft hereinbefore referred to extends. The quill is coupled with the secondary shaft by resilient torque transmitting means preferably but not essentially arranged at each end of the crank case of the engine. The resilient means for transmitting the torque are preferably resilient in all directions of vibration transmission.

The invention furthermore comprises a number of further features the nature and scope of which are set forth and defined in the appended claims. Specific embodiments of these features are shown in the accompanying drawings to which reference will now be made by way of example.

In the accompanying drawings:

Figs. 3 and 4 are elevations similar to Figs. 1 and 2, showing a further embodiment of transmission assembly according to the invention;

Fig. 5 is a fragmentary axial elevation in section illustrating a further feature of the invention;

Figs. 6 and 7 are axial elevations in section, showing respectively two embodiments of dynamo electric machine arranged according to the invention;

Figs. 8 and 9 are respectively an axial elevation in section and a cross-sectional elevation of one embodiment of reciprocating engine according to the invention; and Fig. 10 is an end elevation of a further arrangement of engine according to another feature of the invention.

Figure 1:
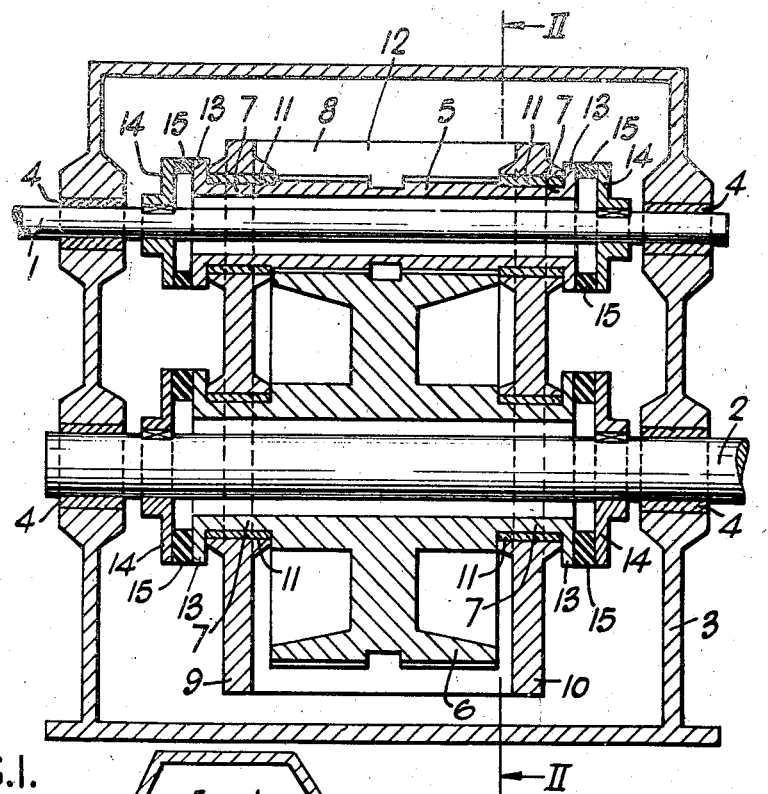
Figs. 1 and 2 are respectively an axial elevation in section and a cross sectional elevation of one embodiment of transmission assembly according to the invention, Fig. 2 being taken on the line II—II of Fig. 1.

The transmission assembly illustrated by Figs. 1 and 2 comprises two shafts 1 and 2 which hereinafter will be referred to as the high speed and low speed shafts, respectively. These shafts are journalled in a casing 3 by means of bearings 4. The arrangement further comprises co-operating transmission elements, which may comprise gear wheels, pulleys coupled by belt means or sprocket wheels coupled by chain means. These transmission elements, designated 5 and 6, are illustrated by way of example as comprising a pinion and gear wheel associated respectively with the high and low speed shafts 1 and 2. It will be understood, however, that an arrangement similar to that illustrated may be employed for belt and chain transmission elements or for compound gear trains.

The pinion 5 and gear wheel 6 are provided with axial extensions 7 which are journalled in a spacer frame 8 which thereby serves to locate the pinion and gear wheel in correct meshing relation with one another.

Preferably, the spacer frame comprises a pair of end plates 9 and 10 carrying bearings 11 for the transmission elements, united by a back plate 12.

The pinion 5 and gear wheel 6 are provided with axial bores through which the shafts 1 and 2 respectively extend with considerable radial clearance. The ends of the gear wheel and pinion are formed with, or have made fast thereto, flanges 13 constituting coupling elements which are connected by resilient means respectively with flanged coupling elements 14 made fast to the shafts 1 and 2. In the example illustrated, the flanges of each pair are connected together by annular members 15 of rubber having their end surfaces bonded to the faces of the flanges.

Figure 2:
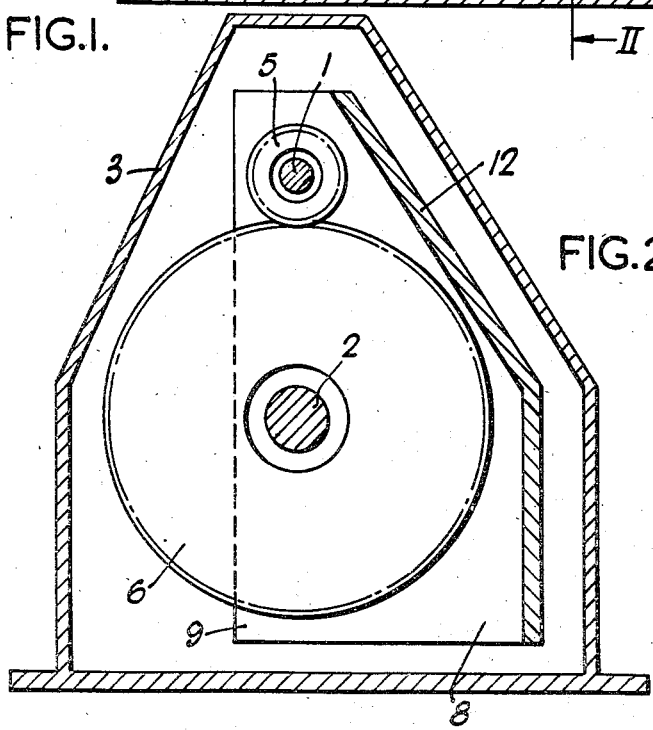

With the arrangement shown in Figs. 1 and 2 the pinion and gear wheel, or other transmission elements such as pulleys or sprockets, are connected with their respective shafts each by means of a pair of resilient couplings which are resilient in all directions of transmission vibration. The vibration emanating from the gear teeth is thus subjected to the attenuating effect of the resilient couplings before reaching the shafts 1 and 2 and passing to the casing 3 through the bearings 4.

The resilient couplings in the arrangement as so far described take the full weight of the transmission elements and the spacer frame 8 and will therefore be distorted so that the axis of each transmission element will not be coincident with that of the associated shaft. The spacing between the gear, sprocket, or pulley centres will be accurately maintained by the rigid spacer frame.

With the simple arrangement of rubber coupling illustrated the rubber of each coupling will be in shear for the vertical dead load and for the torque transmission, but will be in compression or tension for end thrust between the shafts 1 and 2 and the transmission elements. By suitable design of the coupling, for example by the use of axially extending flanges or other axially extending members, the conditions just above set forth may be interchanged if desired, whilst however retaining the resilience of the coupling in all directions of vibration transmission.

It will be understood that the vibration of the spacer frame due to the running of the transmission elements will be substantially unmodified but this vibration before transmission to the casing 3 will be attenuated by the resilient couplings. Direct airborne radiation of vibration from the gears and spacer will occur but will be attenuated by the enclosing gear case.

The casing 3 may, in accordance with a common practice, constitute an oil or lubricant sump for the transmission assembly. In such cases a clearance is preferably maintained between the gears and the lubricant in the sump so as to prevent any transmission of vibration from the gears through the lubricant to the casing. It will then be necessary to provide a circulating pump or other means for supplying the lubricant to the surfaces to be lubricated, and pipes provided for this purpose should preferably be flexible in order to prevent the transmission of vibration.

As stated above, in the arrangement described with reference to Figs. 1 and 2, the spacer frame 8 and the transmission elements are supported by the resilient couplings. In order to reduce the cyclic stresses in the couplings due to the misalignment of the centres of rotation of the transmission elements from the shafts, the frame may be arranged to be supported at least partly from the casing by further resilient means. As hereinafter referred to, means of this kind are indicated in Figs. 3 and 4.

In the arrangement shown in Figs. 3 and 4, the spacer frame 8 is extended so as to form a complete inner enclosure 8a and oil bath for the transmission elements. With the flexible coupling elements 15 arranged as in Figs. 1 and 2, said elements will thus be protected from the oil or other lubricant housed within the inner enclosure 8a.

Figs. 3 and 4 show also an arrangement wherein the shafts 1 and 2, instead of extending through the transmission elements, comprise stub shafts journalled each at one end of the casing 3, being again connected with the transmission elements by the rubber couplings 13, 14, 15. With this arrangement the necessity for bored-out transmission elements is avoided but the torque is transmitted only at one side of each transmission element. In Fig. 3, the other sides of the two transmission units are illustrated as being connected by similar resilient coupling means with stub shafts 1a and 2a mounted in bearings in the casing 3. In general, as stated above, only the stub shaft on one side of each transmission element will be employed for conveying drive to and from the transmission elements, the other stub shafts 1a and 2a in Fig. 3 being employed for the purpose of supporting the weight of the transmission assembly and the spacer frame or the oil bath casing and for controlling displacements of the latter which may otherwise arise during operation due to the asymmetrical torque conditions imposed on the assembly.

Other arrangements for this purpose are however possible. For example, the spacer frame or oil bath may be wholly or partly supported or its movements controlled by means of one or more resilient connecting members between the frame or casing 8 (Figs. 1 and 2) or 8a (Figs. 3 and 4), and the outer casing 3, this element or elements being resilient so as to attenuate transmission of vibration from the frame or inner casing to the outer casing. By way of example, such means are shown in Fig. 4, wherein the inner casing 8a is connected with the outer casing 3 by four rubber blocks 20, each of which is bonded on opposite faces to a pair of metal plates 21 and 22, the plates 21 being secured to the outer casing 3, such as by nuts and bolts 23, and the plates 22 being connected with the inner casing, such as by screws 24. Similar means may be employed for supporting wholly or partly the spacer frame in Figs. 1 and 3. In the application of the resilient means 20 to the arrangement as shown in Fig. 3 wherein the drive is conveyed to one end only of each of the transmission elements, the rubber elements 20 at the upper part of the casing in Fig. 4 are preferably located at the right hand end of the latter in Fig. 3, whilst the lower elements 20 in Fig. 4 are preferably located at the left-hand end of the casing in Fig. 3, it being understood that the stub shafts 1a and 2a and coupling elements 15 connecting said shafts of the transmission elements 5 and 6 may then be omitted.

It will be understood that the modifications described with reference to Figs. 3 and 4 may each be applied to the arrangement of Figs. 1 and 2.

It will further be understood that the arrangements are not restricted to single-stage gearing but any number of gear wheels may be located within the casing 3 by means of two or more pairs of gear wheels on the same or different spacer frames. Furthermore, the arrangements are not limited to spur gears, chain or belt drives, but may be applied also for example to worm and skew gear assemblies.

In the modification illustrated by Fig. 5, which is a fragmentary elevation corresponding with Fig. 1, the gear wheel 6 or other transmission element is of hollow construction, having a pair of axially spaced webs 30 extending between the rim of the gear wheel 6 and respective bosses 31 which are journalled in the bearings 11 in the spacer frame 8. As in the arrangement of Fig. 1 the shaft 2 extends with considerable radial clearance through the bosses, but is connected with the gear wheel by means of a disc 32 made fast to the shaft 2 and coupled with the webs 30 by means of rubber transmission elements 33, the annular faces of which are bonded to the faces of the disc 32 and webs 30.

It will be seen that with the arrangement of Fig. 5 the space within the transmission element is utilised to accommodate the resilient coupling means so that a reduction in over-all dimensions may be obtained. It will be understood that the arrangement although described with reference to a gear wheel as shown in Fig. 5, is generally applicable, for example, to rotating electrical machinery of the type wherein an armature, corresponding with the rim of the gear wheel in Fig. 5 is carried by a spider corresponding with the webs 30 of Fig. 5.

Fig. 6 illustrates one application of the invention to direct or alternating current electric motors or other dynamo electric machines. In Fig. 6, an armature and cooperating field system of the machine are indicated at 41 and 42, respectively, with a field coil at 43. By way of example, a commutator machine is assumed, the commutator being shown at 44 and co-operating brushes at 45. The armature is mounted on a hollow shaft or quill 46 and the field system 42 is carried in frame members 47 and 48 and is located with respect to the armature by means of bearings 49 between said end frames and the hollow armature shaft 46. The brushes 45 are carried by brush rockers mounted on the end frame 47. The machine is mounted within an outer casing 50 having bearings 51 in which is journalled a drive shaft 52. This shaft extends through the hollow armature shaft with considerable radial clearance and the two shafts are coupled together by means of flanged coupling elements 53 mounted on the ends of the armature shaft, flanged coupling elements 54 made fast to the drive shaft 52 and interposed rubber coupling elements 55 bonded to the faces of said flanges or other resilient coupling means as indicated with respect to Figs. 1 and 2.

A tension spring or other resilient tie member 56 is arranged to connect an abutment 57 on the frame member 47 with the outer casing 50 whereby to anchor the field system and brush gear against torque reaction.

Figure 7:
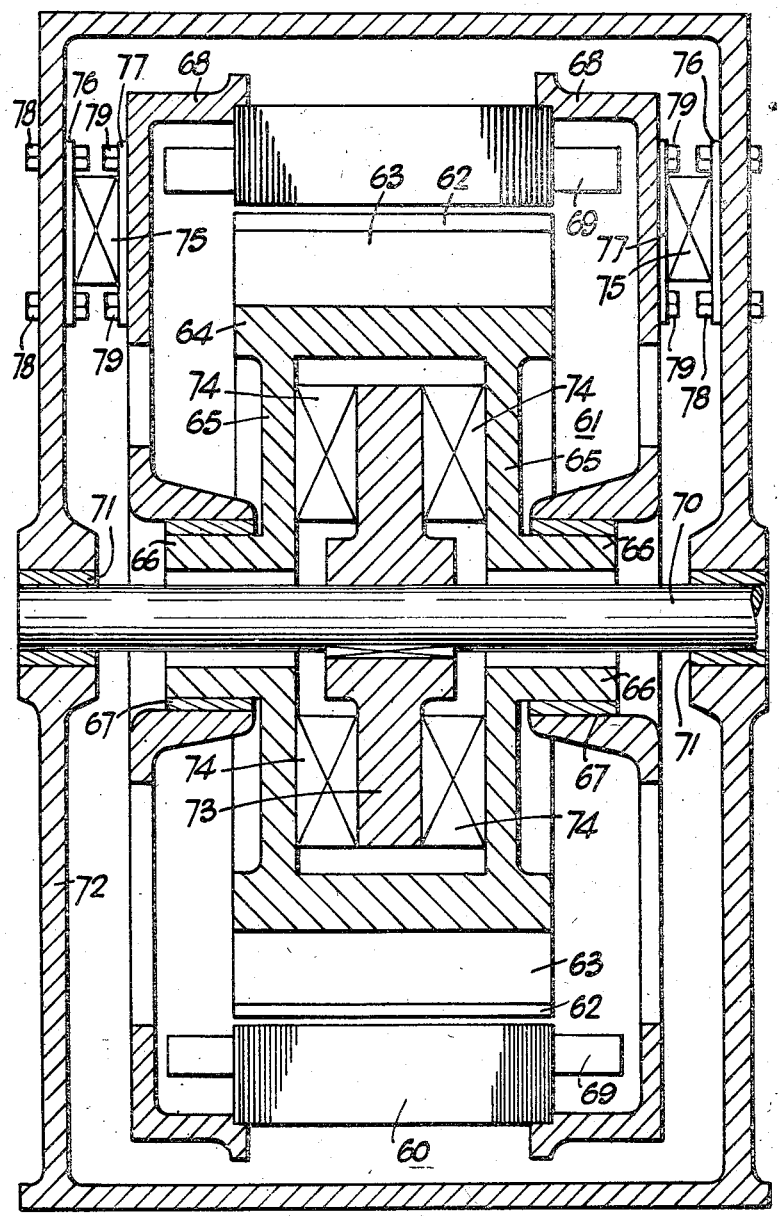

It will be understood that for other types of machines the rotor and stator members may be correspondingly arranged as above described for the armature 41 and field system 42 illustrated in Fig. 7.

It will be seen that the armature or rotor 41 is connected with the drive shaft 52 by the resilient couplings which will transmit the torque developed by the machine and will also serve resiliently to support the weight of the machine. As described with reference to the preceding figures, the resilient couplings may be arranged so as to take the vertical and torque loadings in shear and the end thrusts in tension or compression, or to take the end thrusts in shear and the vertical and torque loadings in compression or tension.

As described with reference to Figs. 1 to 4, the weight of the machine may be borne wholly or partly by further vibration attenuating resilient means connected between the field system or rotor of the machine and a suitable point of the outer casing. In Fig. 6 such optional means are indicated diagrammatically at 59. Said means may, for example, conveniently comprise rubber blocks. These means may also serve wholly or partly to resist the torsional movement of the field system or stator in place of or additional to the resilient means 56. The members 59, when of rubber, may for example be bonded to plates which are bolted or otherwise secured to the frame members 47 and 48 and to the casing 50 such as more fully described with reference to the elements 75 hereinafter to be referred to in the description of Fig. 7.

As will be understood, the electrical connections to the windings of the motor will normally be flexible and this is desirable in the interests of reducing transmission of vibration from the machine to the casing 50 from the electrical connections.

It will be understood that as in the case of gear or other drive assemblies described with reference to Figs.

1–5, the vibration of the machine itself when running will not be substantially modified by the means provided according to the invention, but before transmission to the casing this vibration will be attenuated by the resilient couplings at 55 and the resilient connections at 56 and/or 59. Direct air-borne radiation of vibration from the motor such as arising from windage and brush noise will be attenuated by the casing 50.

The elements 59, in supporting wholly or partly the weight of the machine, will serve to eliminate or reduce the cyclic stresses in the elements 55 resulting from misalignment of the axis of the shaft 46 from that of the shaft 52.

In a modification of the arrangement shown in Fig. 6, instead of employing a hollow armature shaft 46 surrounding the shaft 52, said armature shaft is supported on stub shafts at each end of the machine, with the drive to the armature taken at one or both ends by said stub shafts. In a further modification, only one stub shaft is employed, the machine being supported at the end remote from said stub shaft by resilient means between the frame 47 or 48 as the case may be, and the outer casing 50. These modifications correspond with those hereinbefore described with reference to Figs. 1–4 and may therefore be readily carried out by those skilled in the art without further description herein.

Fig. 7 illustrates the application of arrangements generally in accordance with those referred to in connection with Fig. 5 to a large dynamo electric machine. The machine shown in Fig. 7 comprises a stator 60 and a rotor 61 which is assumed by way of example to be a salient pole rotor comprising poles such as 62 surrounded by field coils such as 63 and mounted on the rim 64 of a rotor spider. This spider comprises two webs 65 having respective bosses 66 journalled by bearings 67 in stator end frame members 68 between which the stator core 60 is clamped. The stator 60 carries any type of input or output winding, coils of which are shown diagrammatically at 69. The driving shaft 70 of the machine extends through the bosses 66, having considerable radial clearance with respect to the latter. This shaft is journalled in bearings 71 mounted in an enclosing outer casing 72 for the machine. A metal disc 73 made fast to the shaft 70 is located in the space within the rotor spider and is coupled with the latter by resilient means, for example annular members 74 of rubber, the end faces of which are bonded to the faces of the disc 73 and the inner faces of the webs 65.

A resilient tie such as 56 described with reference to Fig. 6 will be employed for anchoring the stator of the machine against the torque reaction. Resilient means such as the means 59 described with reference to Fig. 6 may be provided for wholly or partly supporting the weight of the machine so as to relieve the elements 74 wholly or partly supporting the weight of the machine so as to relieve the elements 74 wholly or partly of the vertical loading. One convenient arrangement for this purpose is illustrated in Fig. 7 wherein the stator frame members 68 are connected with the casing 72 by means of a pair of resilient elements which in the example shown each comprise a rubber block 75 bonded to metal plates 76 and 77, the plates 76 being mounted on the inner faces of the end walls of the casing 72 such as by nuts and bolts 78 and the plates 77 being secured to the stator frames 68 such as by screws 79. These rubber blocks are adapted to take the torque reaction on the stator as well as to support the machine. Where desirable, further similar rubber blocks may be distributed circumferentially around the stator.

It will be noted that the arrangement shown in Fig. 7 is advantageous in that the comparatively large space normally available within the rotor of large dynamo electric machines is utilised for accommodating the resilient torque transmitting means provided according to the invention.

In place of the rubber elements 15, 33, 55, or 74, or the rubber supporting elements 20, 59, or 75 in Figs. 1 to 7, the coupling or supporting means may comprise steel springs or resilient cloth fabric for example.

Figs. 8 and 9 illustrate one embodiment of the invention as applied to a diesel or other reciprocating internal combustion engine. As will be understood, the arrangement of Figs. 8 and 9 is also applicable to other reciprocating machines, such as compressors.

In Figs. 8 and 9, the engine may be of any single or multi-cylinder type. For convenience, a twin cylinder engine is illustrated having a crank shaft 80 enclosed within a crank case 81 which is extended so as to accommodate a hollow secondary shaft or quill 82 located parallel with the axis of the crank shaft. The secondary shaft is coupled by gears 83 or otherwise, such as at one or both ends, with the crank shaft. In the example illustrated, two pairs of gears 83 are located one at each end of the crank shaft. The shaft 82 is journalled in the crank case and extends externally of the latter. Flanged coupling members 84 are made fast to one or both ends of the shaft 82 and are coupled by means of resilient elements 85 with flanged members 86 made fast to an output shaft 87 of the engine. The elements 85 conveniently comprise rubber members bonded to the flanges 84 and 86 although other materials, for example cloth fabric or spring steel elements, may be employed in place of the rubber. The output shaft 87 is carried in bearings 88 mounted in an outer casing or hood 89 which completely surrounds the resilient couplings and the engine, including the cylinder block 90 and crank case 81 thereof. The bearings 88 will normally be carried by suitably reinforced or stiffened end parts 92 of the outer casing or hood. The shaft 87 may extend through one end only of the casing as illustrated or, where desired, through both ends thereof to provide the drive to the load.

Resilient means will be provided for anchoring the engine against the torque reaction tending to cause oscillation of the engine about the axis of the shaft 87. Resilient elements for this purpose are illustrated diagrammatically at 93 in Figs. 8 and 9 and may again comprise rubber, cloth fabric, or spring steel.

As in the previously described embodiments of the invention, the resilient coupling means are preferably flexible in all directions of vibration transmission. The design of the coupling elements (85) may or may not be such that such elements tend to support the weight of the engine on the output shaft 87. The spring elements shown at 93 will in general be arranged so as to provide support for the whole or part of the weight of the engine.

The fly wheel may be mounted in the usual way on the crank shaft or may alternatively be mounted on the hollow shaft 82, but is preferably mounted, as illustrated at 94 in Fig. 8, on the output shaft 87 so as to be resiliently coupled with the engine by the resilient coupling means 85.

The fuel, exhaust gases, and coolant may be conducted by any of the suitable forms of flexible piping as are well known in the art, whereby also to prevent vibration transmission.

It will be seen that the arrangement comprises a combined engine and gear train and may therefore be utilised for obtaining when desired a speed of the output shaft different in any desired ratio, greater or less than unity, from that of the crank shaft.

In Figs. 8 and 9 the secondary shaft is illustrated as located below the crank shaft but it will be understood that other arrangements are possible. For example, with a view to reducing the overall height of the enclosed engine, said secondary shaft may be arranged to one side of the crank shaft, this arrangement having further advantages when employed in an arrangement as hereinafter to be described with reference to Fig. 10.

Two or more engines may be enclosed within a single hood or casing common to the several engines which may then be coupled either with separate output shafts or with a single output shaft. Conveniently, in the latter case, the several crank shafts will be geared or otherwise coupled with a single secondary shaft, itself coupled resiliently with the output shaft.

Fig. 10 illustrates a preferred arrangement for the common enclosure of two engines. An outer hood or casing is again illustrated at 89 whilst the cylinder blocks of the two engines are designated 90a and 90b. The output shaft is again shown at 87. The crank-shafts are designated 80a and 80b and with a view to reducing the overall height of the enclosed engine these crank-shafts are located one on each side of the secondary shaft 82, the two crank-shafts being parallel with one another and coupled with the secondary shaft at one or each end of the engine by gear wheels 83a and 83b mounted on the crank-shafts and meshing with a common gear wheel 83' made fast to the hollow secondary shaft. Conveniently, a single crank case 81 is employed for the two crank shafts in common with one another and for enclosing also the secondary shaft and gear drive.

What I claim is:

1. A mechanical assembly comprising at least two relatively movable parts, a casing enclosing said parts, at least one drive shaft, bearings supporting said drive shaft, spacing means disposed within and movable independently of said casing, bearings in said spacing means locating said parts in required space relationship with one another for relative rotation in predetermined relative axial positioning, and resilient vibration attenuating means coupling said shaft with one of said parts and supporting said spacing means within said casing for movement within the casing.

2. A mechanical assembly comprising at least two relatively rotatable parts, a casing enclosing said parts, at least one drive shaft, bearings supporting said drive shaft, spacing means carrying bearings locating said parts with respect to said spacing means and thereby maintaining the axes of said parts in predetermined relative positioning, said spacing means being movable within said casing, and resilient vibration attenuating means coupling said shaft with one of said parts and supporting said spacing means within said casing.

3. A mechanical assembly comprising at least two relatively rotatable parts, a casing enclosing said parts, at least one drive shaft, bearings supporting said drive shaft, bearing surfaces on one of said parts and cooperating bearing surfaces on another of said parts directly locating said parts for relative rotation on a predetermined axis, and resilient vibration attenuating means coupling said shaft with one of said parts and supporting the other of said parts for movement in directions perpendicular to said axis within said casing.

4. A mechanical assembly comprising at least two relatively rotatable parts, a casing enclosing said parts, at least one external drive shaft extending into said casing, bearings in said casing supporting said drive shaft, spacing means disposed within and movable independently of said casing, bearings in said spacing means locating said parts in required space relationship with one another for relative rotation about predetermined axes, and resilient vibration attenuating means disposed within said casing and coupling said shaft with one of said parts and supporting said spacing means within said casing for movement within the casing.

5. A mechanical assembly comprising at least two relatively movable parts, a casing enclosing said parts, at least one external drive shaft extending into said casing, bearings in said casing supporting said drive shaft, spacing means carrying bearings locating said parts with respect to said spacing means and thereby maintaining the axes of said parts in predetermined relative positioning, said spacing means being movable within said casing, and resilient vibration attenuating means disposed within said casing and coupling said shaft with one of said parts and supporting said spacing means within said casing.

6. A mechanical assembly comprising a dynamo-electric machine stator and cooperating rotor parts, a casing enclosing said stator and rotor, a drive shaft, bearings supporting said drive shaft, bearing surfaces on said stator part and cooperating bearing surfaces on said rotor part locating said stator and rotor parts for relative rotation on a predetermined axis, and resilient vibration attenuating means coupling said rotor shaft with said rotor and supporting the stator and rotor parts for movement within said casing, and further resilient vibration attenuating means for resisting torque reaction on said stator part.

7. A mechanical assembly comprising at least two mechanical transmission elements cooperating with one another, a casing enclosing said elements, driving and driven shafts, bearings supporting said shafts, spacing means carrying bearings locating said elements with respect to said spacing means and thereby maintaining the axes of said elements in predetermined relative positioning independently of said shafts, said spacing means being movable within said casing, and resilient vibration attenuating means coupling said shafts with said elements and supporting said spacing means within said casing.

8. A mechanical assembly comprising a gear wheel assembly consisting of at least two meshing gear wheels, a casing enclosing said gear wheels, driving and driven shafts, bearings supporting said shafts, spacing means carrying bearings locating said gear wheels with respect to said spacing means and thereby maintaining the axes of said gear wheels in predetermined relative positioning independently of said shafts, said spacing means being movable within said casing, and resilient vibration attenuating means coupling said shafts with said gear wheels and supporting said spacing means within said casing.

9. A mechanical assembly comprising a dynamo-electric machine stator and cooperating rotor parts, a casing enclosing said stator and rotor parts, a rotor shaft extending through at least one wall of said casing, bearings in said casing supporting said rotor shaft, bearing surfaces on said stator part and cooperating bearing surfaces on said rotor part locating said stator and rotor parts for relative rotation on a predetermined axis, and resilient vibration attenuating means disposed within said casing and coupling said rotor shaft with said rotor part and supporting the stator and rotor parts for movement within said casing, and further resilient vibration attenuating means for resisting torque reaction on said stator part.

10. A mechanical assembly comprising at least two mechanical transmission elements cooperating with one another, a casing enclosing said elements, driving and driven shafts extending through at least one wall of said casing, bearings in said casing supporting said shafts, spacing means carrying bearings locating said elements with respect to said spacing means and thereby maintaining the axes of said elements in predetermined relative positioning independently of said shafts, said spacing means being movable within said casing, and resilient vibration attenuating means disposed within said casing and coupling said shafts with said elements and supporting said spacing means within said casing.

11. A mechanical assembly comprising a gear wheel assembly consisting of at least two meshing gear wheels, a casing enclosing said gear wheels, driving and driven shafts extending through at least one wall of said casing, bearings in said casing supporting said shafts, spacing means carrying bearings locating said gear wheels with respect to said spacing means and thereby maintaining the axes of said wheels in predetermined relative positioning independently of said shafts, said spacing means being movable within said casing, and resilient vibration attenuating means disposed within said casing and coupling said shafts with said gear wheels and supporting said spacing means within said casing.

12. A mechanical assembly comprising at least two relatively rotatable parts, a casing enclosing said parts, at least one external drive shaft extending into said casing, bearings in said casing supporting said drive shaft, bearing surfaces on one of said parts and cooperating bearing surfaces on another of said parts directly locating said parts for relative rotation in predetermined axial relationship, and resilient vibration attenuating means disposed within said casing and coupling said shaft with one of said parts and supporting the other of said parts for movement in directions perpendicular to its axis within said casing.

13. A mechanical assembly as defined in claim 12, in which said resilient vibration attenuating means are resilient in all directions of vibration transmission.

14. A mechanical assembly as defined in claim 12, wherein at least one of said parts surrounds said drive shaft and is coupled with said shaft by said resilient vibration attenuating means at each end of said part.

15. A mechanical assembly as defined in claim 12, wherein at least one of said parts is coupled at one end thereof with said resilient vibration attenuating means, and including further resilient means and a supporting element within the casing supporting the other end of said part.

16. A mechanical assembly as defined in claim 15, in which said supporting element comprises a stub-shaft journaled within the casing.

17. A mechanical assembly as defined in claim 12, wherein said drive shaft extends through one of said relatively rotatable parts and carries within said part a drive-transmitting member and said resilient vibration attenuating means.

18. A dynamo-electric machine as defined in claim 12, wherein one of said parts comprises a rotor element mounted on a spider having said vibration attenuating means arranged therein, and the other of said parts comprises a stator element cooperating with said rotor element and having a frame carrying said bearing surfaces which cooperate with the bearing surfaces of the rotor element and which register said frame of the stator element and said spider of the rotor element.

19. A mechanical assembly as defined in claim 12, including a reciprocating engine mounted within said casing and having a crank shaft, and a secondary shaft mounted within said casing, and wherein said resilient attenuating means are at each end of said secondary shaft and said drive shaft to transmit the driving torque thereto.

20. A mechanical assembly as defined in claim 19, wherein said secondary shaft is hollow, and said drive shaft extends therethrough.

21. A mechanical assembly as defined in claim 19, wherein said secondary shaft is hollow with the drive shaft extending therethrough and said resilient vibration attenuating means are at each end of secondary shaft.

22. A mechanical assembly as defined in claim 12, including resilient means separate from said vibration attenuating means for supporting at least partially said parts of the assembly.

23. A mechanical assembly as defined in claim 22, including spacing means for said parts of the assembly, and wherein said resilient means separate from said vibration attenuating means are located relatively to said spacing means to oppose torque reaction on one of said parts.

24. A mechanical assembly as defined in claim 22, wherein said resilient means separate from said vibration attenuating means are resilient in all directions of vibration transmission.

References Cited in the file of this patent
UNITED STATES PATENTS 1,031,758    Westinghouse _____ July 9, 1912